US007188711B2

(12) United States Patent
Gripemark et al.

(10) Patent No.: US 7,188,711 B2
(45) Date of Patent: Mar. 13, 2007

(54) DISC TO CENTRAL PART INTERFACE FOR DISC BRAKES

(75) Inventors: Joakim Gripemark, Helsingborg (SE); Patrik Kall, Helsingborg (SE); Goran Stensson, Brosarp (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 10/924,065

(22) Filed: Aug. 23, 2004

(65) Prior Publication Data
US 2005/0056498 A1   Mar. 17, 2005

(30) Foreign Application Priority Data
Aug. 21, 2003   (SE) .................................. 0302257

(51) Int. Cl.
*F16D 55/00* (2006.01)
(52) U.S. Cl. ................. 188/73.31; 188/18 A; 188/71.5
(58) Field of Classification Search ............. 188/73.31, 188/73.32, 73.36, 18 A, 26, 71.5 X, 17, 71.1
See application file for complete search history.

(56) References Cited
U.S. PATENT DOCUMENTS

| 4,605,103 | A |   | 8/1986 | Carre et al. |
|---|---|---|---|---|
| 5,046,596 | A |   | 9/1991 | Dennert |
| 5,213,437 | A |   | 5/1993 | Sommer |
| 6,298,953 | B1 | * | 10/2001 | Bunker ...................... 188/71.1 |
| 6,705,437 | B2 | * | 3/2004 | Severinsson et al. .... 188/73.32 |

* cited by examiner

*Primary Examiner*—Melanie Torres
(74) *Attorney, Agent, or Firm*—St. Onge Steward Johnston & Reens LLC

(57) ABSTRACT

The present invention concerns disc brakes and more precisely a brake disc (2) to central part (3) interface. The disc brake has a caliper (1) receiving one or more brake pads (8) and encircling one or more brake discs (2). At least one of the brake discs (2) is received sliding on a central part (3) in the form of a hub, a sleeve or the like. Said central part (3) is received on a wheel axle or the like. The discs (2) are connected to the central part (3) in a rotationally interlocked but axially sliding way by means of teeth (4, 5), splines or the like. At least contact parts of the teeth (4, 5) or the like of the at least one disc (2) and/or the central part (3) have the form of arcs, seen in the direction of the wheel axis. Said contact parts are the parts of the teeth faces expected to make contact with each other in a released position of the brake.

13 Claims, 8 Drawing Sheets

DISC TO CENTRAL PART INTERFACE FOR DISC BRAKES

TECHNICAL FIELD

The present invention concerns disc brakes. Even though the disc brakes have been developed for heavy-duty vehicles, a person skilled in the art realises that they may be used for any type of vehicle.

The present invention is primarily directed to the situation when the brake is in a released condition.

PRIOR ART

The type of disc brakes for which the present invention is developed has one or more brake discs, of which at least one is sliding in an axial direction. The brake discs are received on a central part, which may be a sleeve received on a hub, the hub itself or any other means arranged in connection with a wheel axle or the like. The sliding discs are received in a rotationally fixed or interlocked way on the central part but slidable in axial direction. The interface between discs and said central part may be in the form of teeth, splines or the like. The rotational interlocking is needed in order to transfer the braking forces from brake pads acting on the discs, via the central part to the wheel axle or the like.

As used in this description the expression "wheel axle" is use in a broad sense to facilitate the description. In many vehicles there is no literal wheel axle, at least not for non-driving wheels. The wheels are often supported by some kind of struts etc. of a wheel suspension. Often the wheel is received on an axle stud.

The present disc brakes having one or more sliding discs often rattle in released condition. This is due to the fact that the teeth or the like of the brake discs and the central part have contact faces being either straight or curved in a not optimum way and that there has to be a clearance in the interface. To assure a reliable sliding function it is necessary to have a considerable clearance in the interface between the central part and the brake discs, due to the fact that brakes often are exposed to dirt and corrosion. The clearance produces a minor displacement of the rotational centres of sleeve and disc, mainly in a vertical direction. Thus, the discs may be displaced a short distance in radial direction relative the central part. During rotation the displacement will change intermittently, which may lead to generation of vibrations and noise.

In case of teeth having straight faces the displacement between the disc and the central part may vary during rotation. The displacement will achieve maximum and minimum values at rotation angles corresponding to the pitch angle of the teeth. These variations between maximum and minimum values normally cause vibrations and noise. The same situation occurs in case of teeth having curved faces if they are not designed to avoid this situation.

The number of teeth in simultaneous contact is often one or two at each side of a vertical centre line. This small number of contacts may cause vibrations and noise at teeth change over also for teeth designed to avoid the situation with a changing radial displacement, due to unavoidable manufacturing imperfections.

By "straight" as used in this description is meant that the teeth faces, or the like, are not curved seen in the direction of the wheel axis, even though they may have different angles in relation to the circumference of the disc or the central part.

SUMMARY OF THE INVENTION

The disc brake of the present invention has one or more brake discs, of which at least one is sliding on a central part. The sliding brake discs are received on the central part in form of a sleeve, a hub or the like by means of teeth, splines or any other means, giving an interface which is rotationally interlocked but axially sliding.

In order to have an interface that does not rattle a number of conditions should be satisfied according to the present invention. The displacement between each disc and the central part should be as constant as possible during rotation in a released position, i.e. rotation when the brake is not actuated. Furthermore, at least two teeth of each disc should be in contact with at least two teeth of the central part at each side of a vertical centre line. The angular length of the parts of the teeth faces expected to make contact during rotation in released position, should exceed a certain length, depending on the number of teeth. To facilitate this description these parts are often referred to as contact parts. If properly designed the teeth should be curved in such a way that the tangent at the point of contact between the teeth is substantially horizontal.

As stated above the interface between the disc(s) and the central part should ideally be such that the mutual vertical positions of the disc(s) and the central part do not change during rotation. Thus, the displacement between each disc and the central part should be constant or almost constant in a released position of the brake. Due to production imperfections etc. displacement is not always exactly constant, and that is reflected above with the use of the expression "almost constant".

According to the present invention the teeth are arc-faced, i.e. the contact faces of the teeth have the form of arcs seen in the direction of the wheel axis. Furthermore, the nominal clearance between the contact faces of the teeth of the disc(s) and the central part is almost constant over a certain angular length, i.e. the curve form of the teeth of the discs and the central part are almost identical for that angular length. Said angular length is the length of the parts of the teeth expected to make contact during rotation in released position, or contact parts as stated above. As used here "nominal clearance" is determined in a position with zero displacement of the rotational centres between the disc and the central part.

It should be noted that the parts expected to make contact relates to a released position of the brake. For some brakes different parts of the teeth faces may be in contact in released position and in a braking position.

Due to the design of the present invention the displacement will not vary during rotation. Thus, no or almost no vibrations and noise will arise due to the clearance in the interface between disc and central part, and the clearance may be selected large enough to assure a reliable sliding function under all circumstances. The arcs may have constant or varying radii. An arc with a constant radius is a single circle arc, while an arc with varying radius will have a curve form differing from a single circle arc, thus it may have a regular or irregular curve form. The exact form of the curves of the teeth may vary as long as the desired conditions are satisfied.

To assure an almost constant radial displacement during rotation the angular length of the contact parts of each tooth of each disc and the central part, respectively, is at least equal to the teeth pitch angle. If the angular length of the contact parts of each tooth is at least twice the teeth pitch angle, the number of teeth in simultaneous contact will be two or more at each side of a vertical centre line. The increased number of contacts reduces vibrations and noise at teeth change over, because the sensitivity to manufacturing imperfections is reduced.

In case the angular length of the contact parts of the teeth exceeds 90°, preferably close to 180°, the theoretical number of simultaneous teeth contacts will be large and in the region of 25 to 50% of the total number of teeth. This large number of contacts reduces the vibrations and noise even more as the sensitivity to manufacturing imperfections will be very low. The wear resistance will be improved too.

If the central part has helical splines a reduction of vibrations and noise will normally be achieved, even if the teeth of the disc(s) have straight teeth faces.

To simplify the description the expressions "teeth" and "central part", and similar expressions, are used throughout the description. Thus, the expressions should be construed in a broad sense. Here "teeth" also includes splines or any other means giving a rotational interlocking with axial sliding. "Central part" includes a sleeve, a hub or any other part on which the brake discs are received. As used in this description the expressions "axial", "radial" and similar expressions are in relation to the wheel axis (not shown).

Due to the arc form of the teeth the point of contact between the central part and the disc will go along the arc.

One object of the present invention is that the level of vibrations and thus, noise should be reduced in the released condition of the brake.

A further object of the present invention is to improve the wear resistance in the interface between the brake discs and the central part. Still a further object is to reduce the sensitivity to manufacture tolerances and imperfections.

According to the invention a disc brake having a caliper receiving one or more brake pads and encircling one or more brake discs is arranged. At least one of the brake discs is received sliding on a central part in the form of a hub, a sleeve or the like. The central part is received on a wheel axle or the like. The discs are connected to the central part in a rotationally interlocked but axially sliding way by means of teeth, splines or the like. At least contact parts of the teeth and/or splines of the at least one disc and/or the central part have the form of arcs, seen in the direction of the wheel axis. The contact parts are the parts of the teeth faces expected to make contact with each other in a released position of the brake.

Further objects and advantages with the present invention will be obvious for a person skilled in the art when reading the detailed description below of at present preferred embodiments.

BRIEF DESCRIPTION OF THE DRAWINGS

The invention will be described more closely below by way of examples and with reference to the enclosed drawings. In the drawings.

DETAILED DESCRIPTION OF PREFERRED EMBODIMENTS

Figure 1:
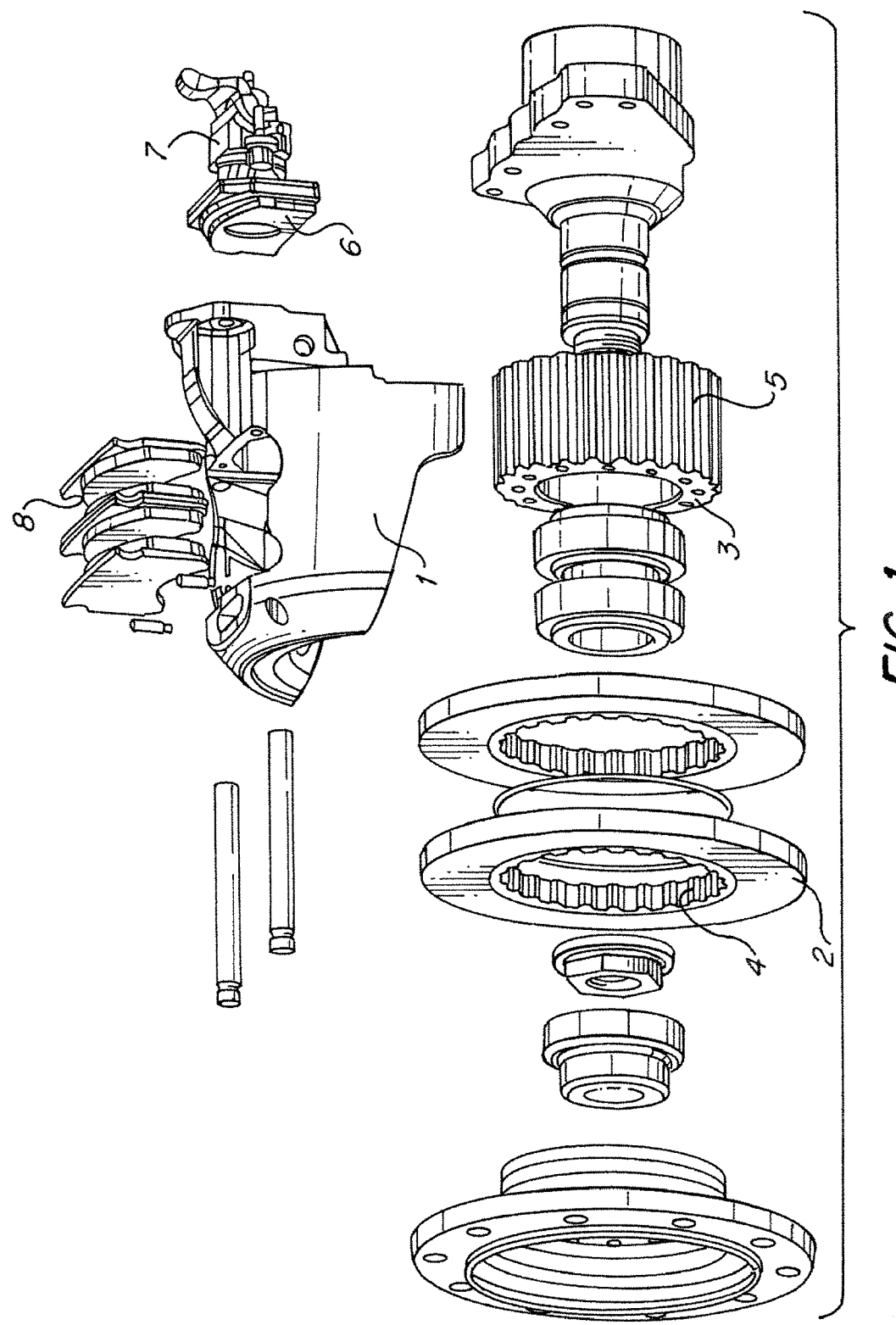
FIG. 1 is an exploded view of an example of a disc brake.

In FIG. 1 one example of a disc brake is shown. A person skilled in the art realises that the principles of the present invention apply for disc brakes having many different structures. Only parts important for the understanding of the present invention will be specifically referred to in the description below.

The disc brake as shown has a caliper 1 surrounding two brake discs 2 received on a central part 3, here in the form of a hub. The brake discs 2 have teeth 4 on an inner circumference, which teeth 4 are to mesh with teeth 5 on the outer circumference of the central part 3. Brake pads 8 are received slidable in the caliper 1 in a normal way. The brake pads 8 are applied by means of a thrust plate 6 and a brake mechanism 7, received in the caliper 1. Braking torque is transferred from the discs 2 to the central part 3 by means of the teeth 4, 5 and/or splines of the brake discs 2 and central part 3, respectively. The teeth 4, 5 and/or splines of the discs 2 and central part 3, respectively have a general extension being either parallel or not parallel to the rotational axis of the disc. Thus, helical teeth or splines may be used. In some embodiments helical splines on a central part co-operates with brake disc(s) having straight-faced teeth.

By means of the teeth 4 the discs 2 are received giving an interlocked interface in rotational direction but a sliding interface in axial direction. In other embodiments (not shown) other number of discs 2 are used and one disc 2 may be fixed in axial direction. Brake pads 8 are placed on both sides of each brake discs 2. Also the brake pads 8 are received moveable in axial direction in the caliper 1, even though the brake pad 8 furthest from the thrust plate may be fixed. During braking the brake mechanism 7 will press the thrust plate 6 against the adjacent brake pad 8, which will be pressed against the brake disc 2 and so on. Braking will occur as the brake pads 8 and brake discs 2 are pressed against each other.

Figure 2A:
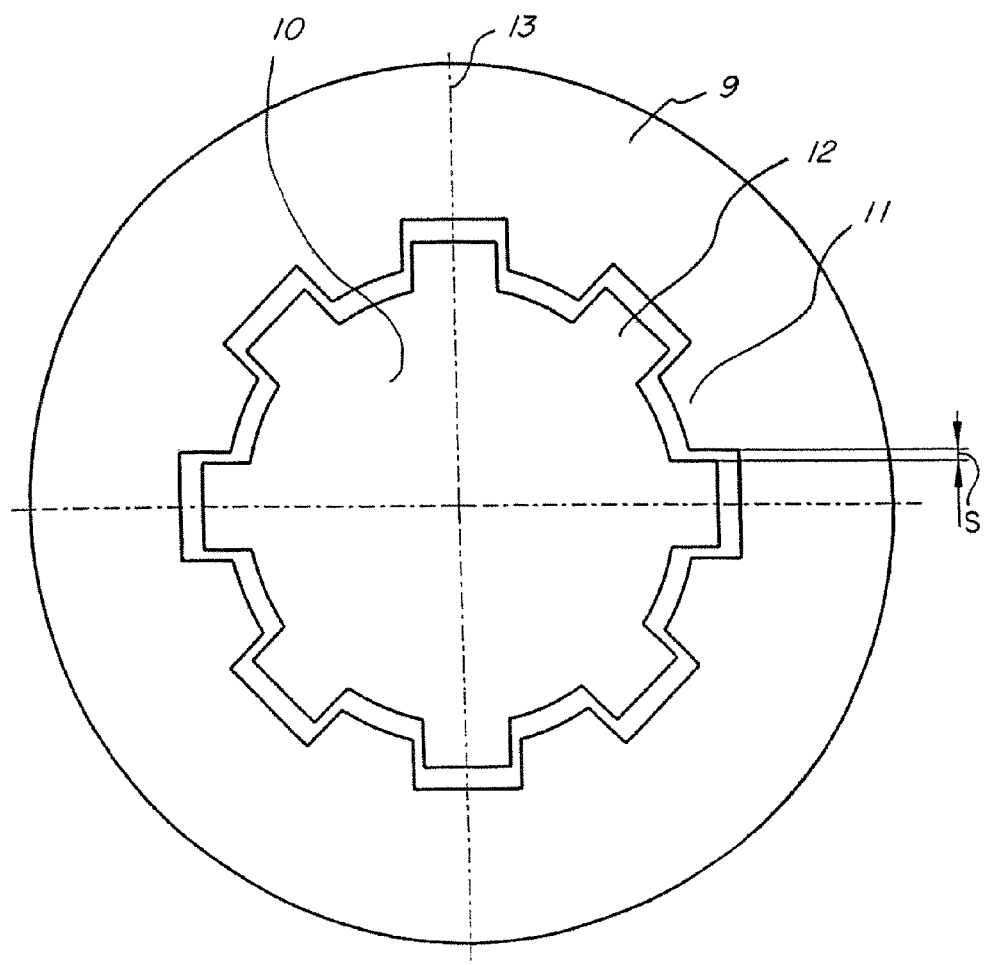
FIGS. 2a to 2c are principal sketches of a prior art interface.

In order for the brake discs 2 to be able to slide on the central part 3 in the form of a hub, sleeve or the like, there has to be a certain play in the contact of the teeth 4, 5 of the discs 2 and the central part 3, respectively. Reference is made to FIG. 2 showing the principles of disc brakes of the prior art having discs 9 and a central part 10 with straight-faced teeth 11 and 12, respectively. To simplify the explanation the shown disc 9 and central part 10 only have eight teeth 11, 12 each. Furthermore, the clearance is exaggerated.

Figure 2B:
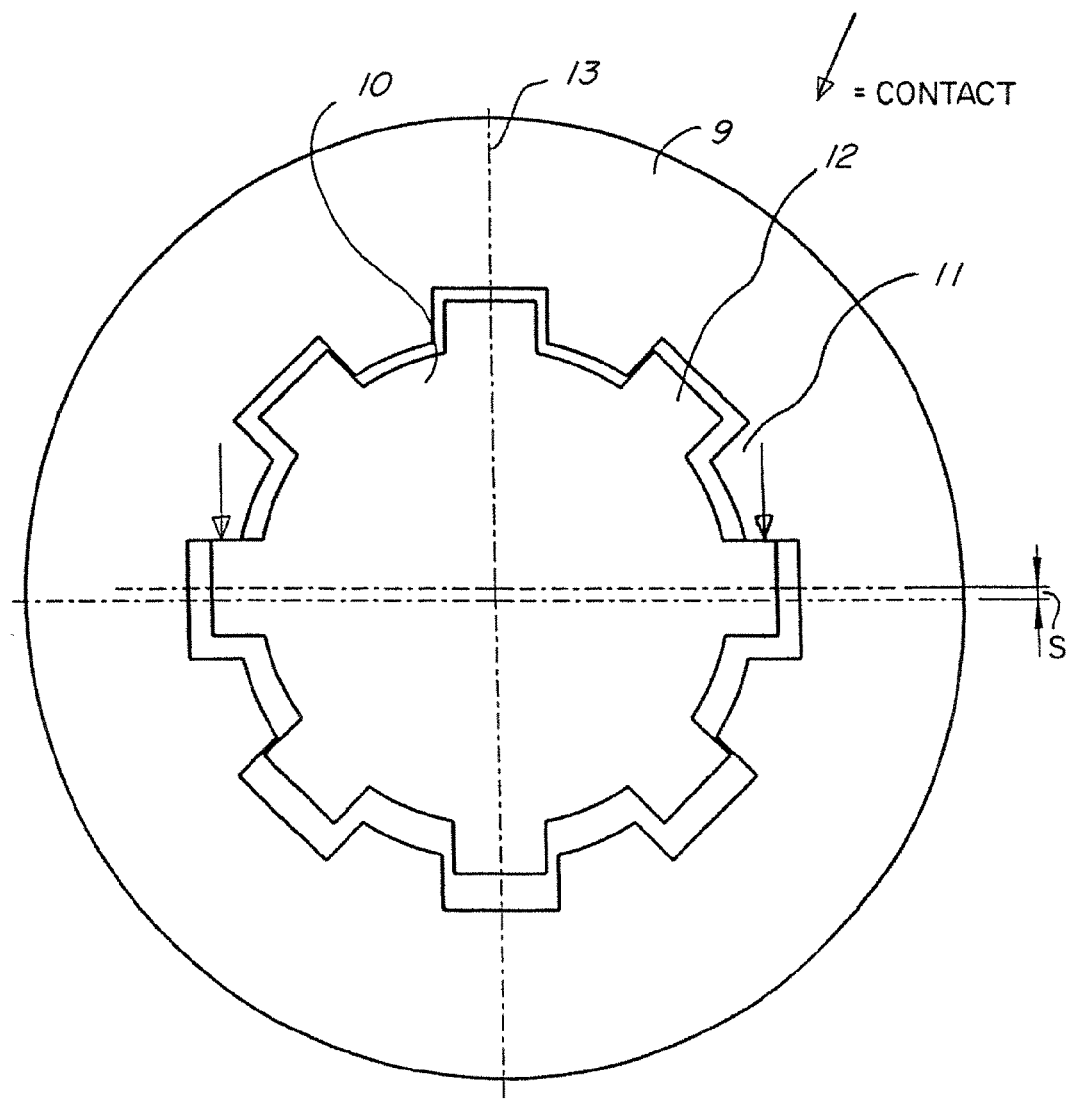
Figure 2C:
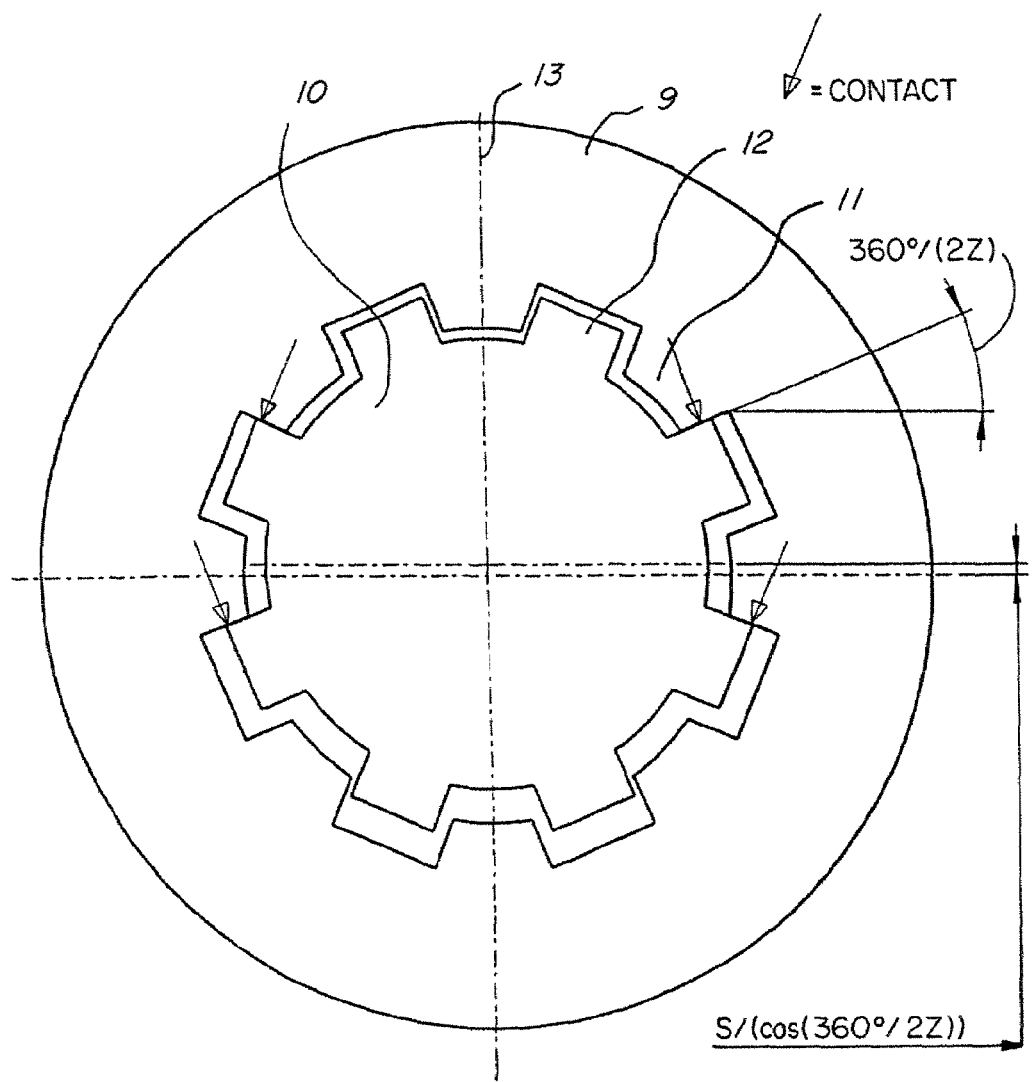
Figure 3A:
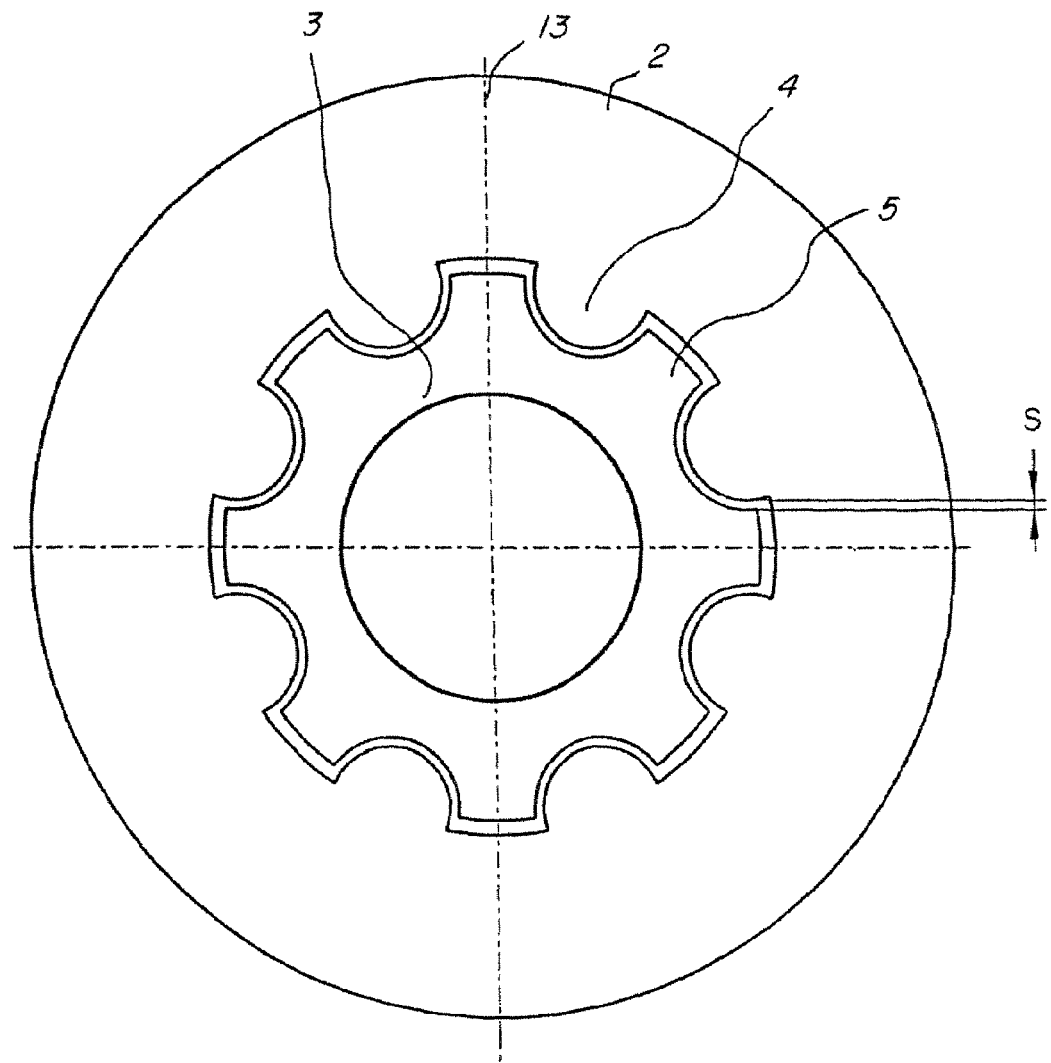
FIGS. 3a to 3c are principal sketches, corresponding to FIGS. 2a to 2c of an interface encompassing the present invention.
Figure 3B:
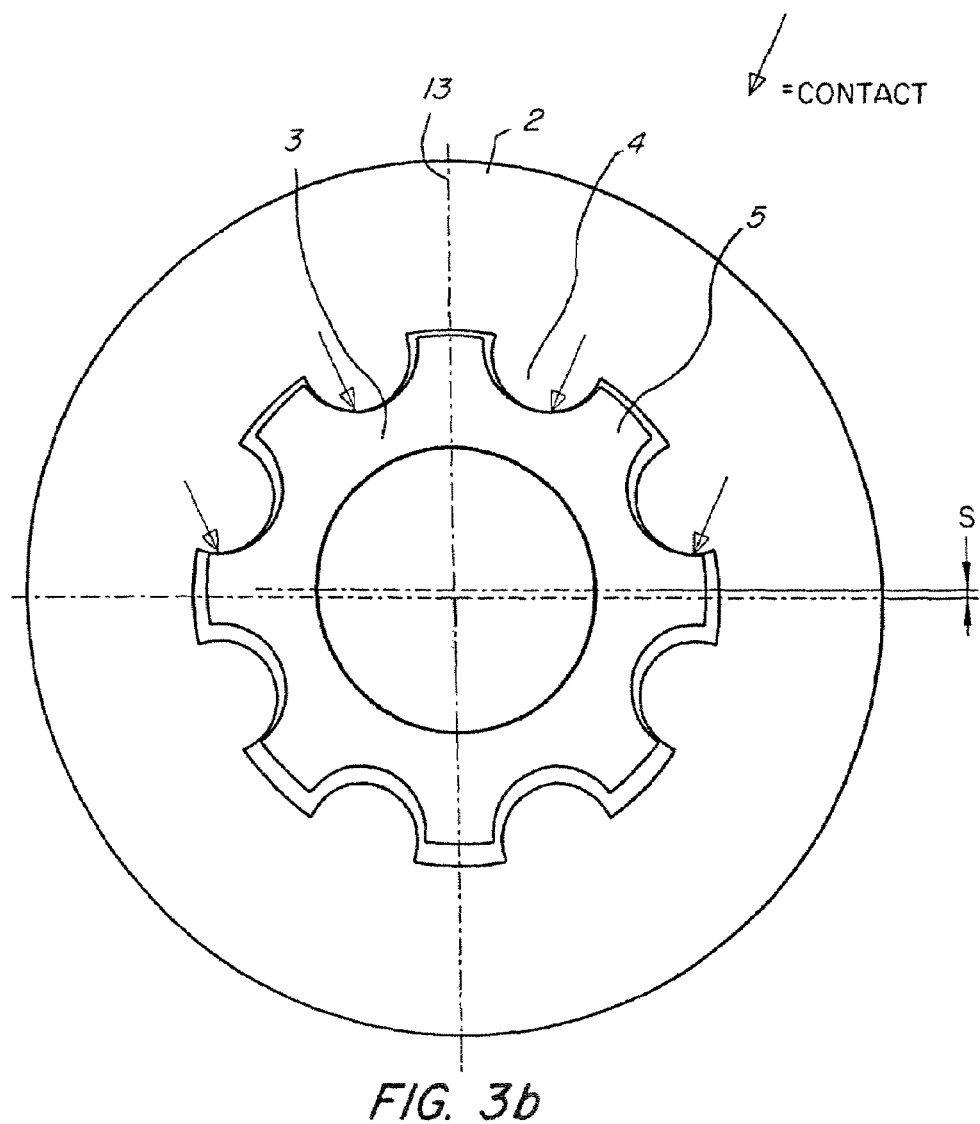
Figure 3C:
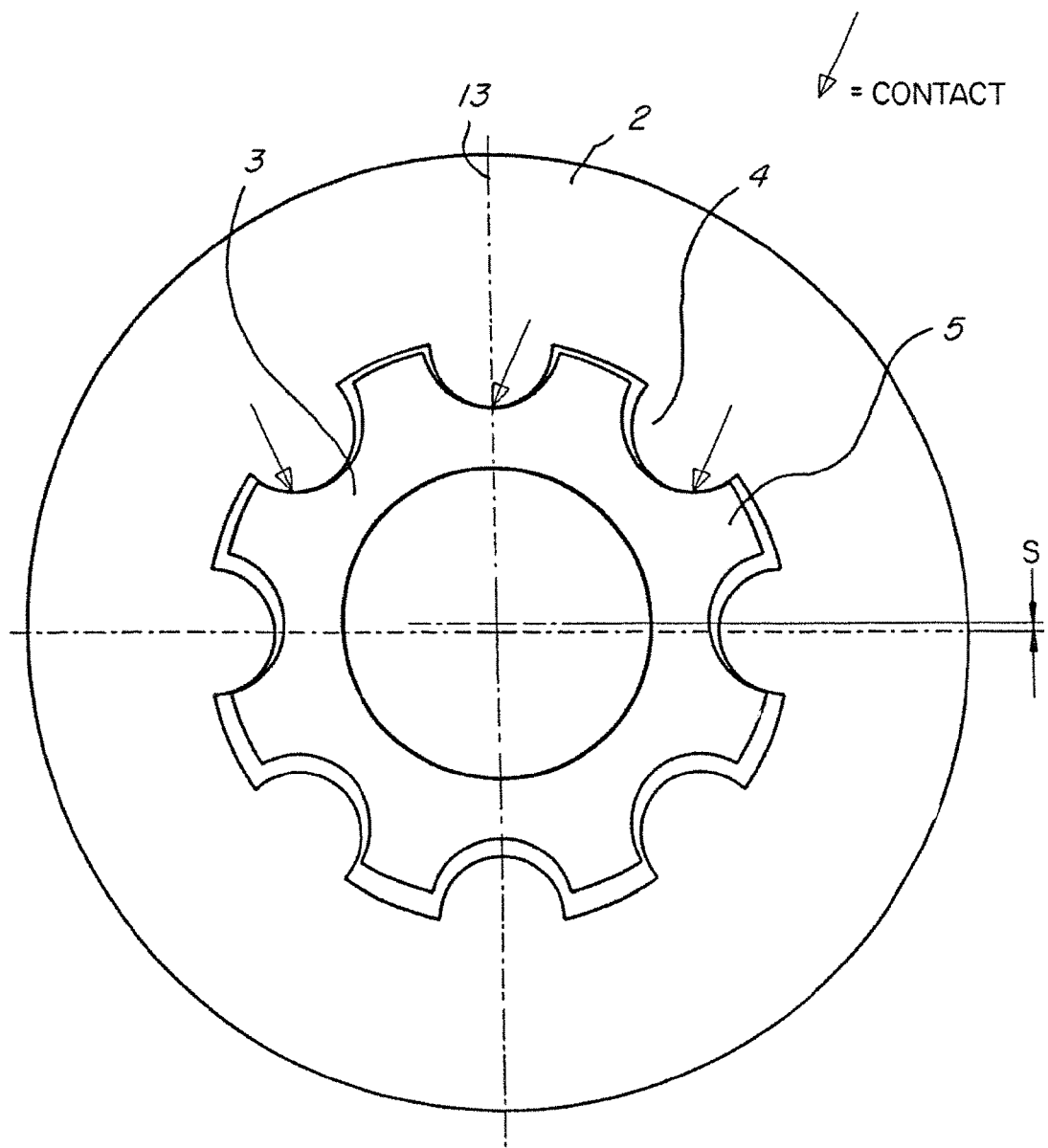
Figure 4A:
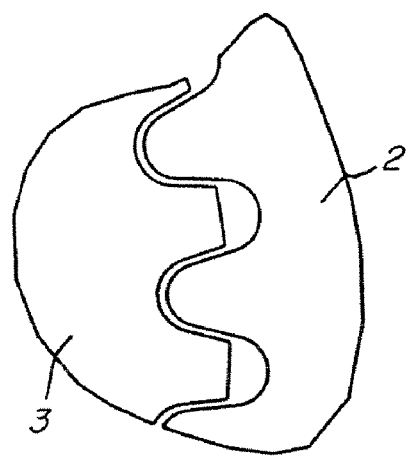
FIGS. 4a to 4f show examples of different tooth forms, possible to use with the present invention.
Figure 4B:
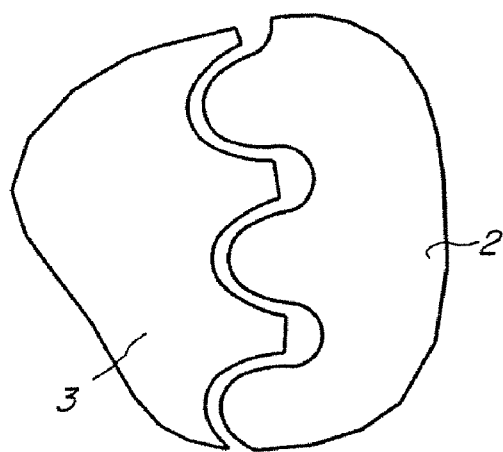
Figure 4C:
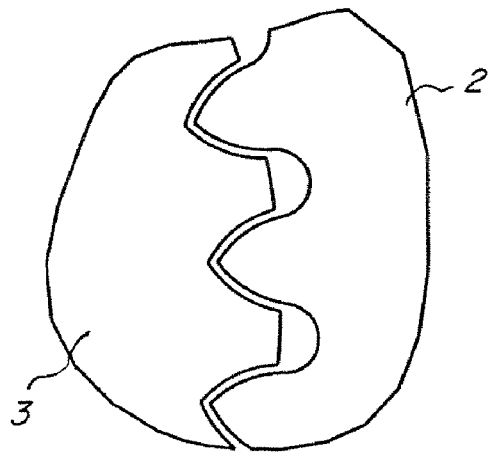
Figure 4D:
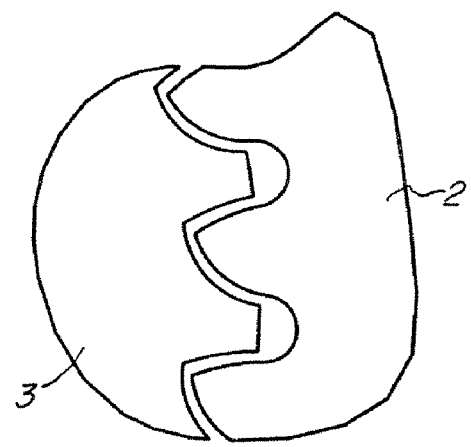
Figure 4E:
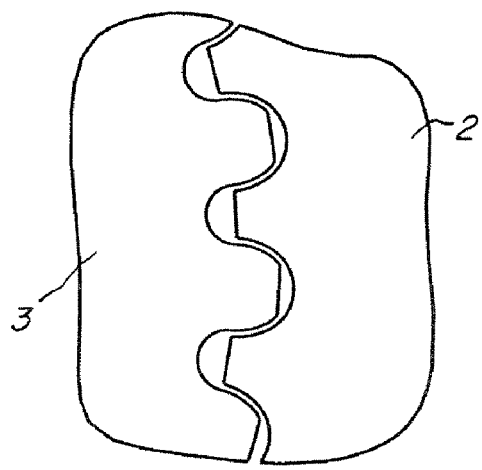
Figure 4F:
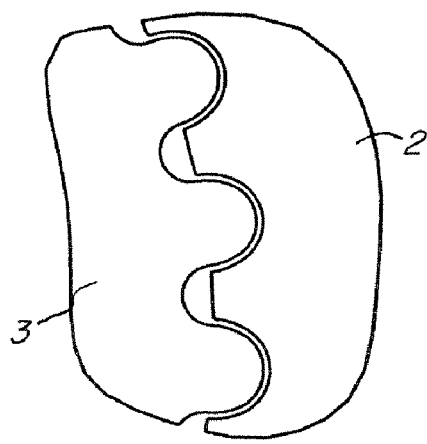

As indicated above the present invention is concerned with the situation when the brake is in a released condition. With the rotating disc 9 and central part 10 in the position of FIG. 2a the disc 9 usually drop the distance s, corresponding to the clearance. Thus, the centres of rotation for the disc 9 and central part 10, respectively, will usually be displaced mainly in a vertical direction, as shown in FIG. 2b. Furthermore, normally there will only be contact for one pair of teeth 11, 12 on each side of a centre line 13. Said contact will normally be held until the disc 9 and central part 10 have rotated to a position in which the teeth in contact is at an angle of about 22.5 ° in relation to a horizontal line, as shown in FIG. 2c. The angle of 22.5° is due to the number of teeth in the shown example. If the number of teeth differs also said angle will differ. In the position of FIG. 2c the contact normally go over to new pairs of teeth 11, 12. The displacement between the centres of rotation of the disc 9 and central part 10 usually vary during rotation, and is largest when the contact goes over to new pairs of teeth. When the contact goes over from one pair of teeth to another pair of teeth, the disc 9 normally begin to decrease its displacement in relation to the central part 10 until it again reaches a distance corresponding to the clearance, which occurs at the position shown in FIG. 2b. Said varying displacement creates vibrations and noise when the teeth 11 of the displaced brake disc 9 hits the teeth 12 of the central part 10, forming the new contact point.

The magnitude of said varying displacement might be reduced, by arranging the teeth and/or splines to be not parallel to the rotational axis of the disc, giving helical teeth and/or splines. The faces of the teeth and/or splines may be straight or arc formed. It enables a particular tooth or spline to provide a horizontal contact face during a determined interval of angular rotation of the disc. It concentrates the contact to a point moving axially along the tooth or spline during rotation. However, the most preferred design is the arc shaped contact faces described below, as they avoid the above varying displacement combined with maintaining a contact over a considerable length in axial direction.

According to the invention the teeth 4, 5 and/or splines of the disc 2 and the central part 3 have contact faces in the form of arcs with constant or varying radii. Furthermore, the nominal clearance between the contact faces of the teeth of the disc(s) and the central part is almost constant over a certain angular length, i.e. the contact part. The nominal clearance is determined in a position with zero displacement of the rotational centres between the disc 2 and the central part 3, and in an angular position with approximately the same clearance on the right and left side of an individual tooth.

In practice the clearance between the teeth 4, 5 and/or splines of a specific pair will vary during rotation depending on the actual position of the turn. The clearance will go between contact and maximal clearance during one revolution. The maximal clearance is about twice the nominal clearance. However, the displacement between the central part 3 and each disc 2 will be virtually constant.

During rotation the point of contact of one specific pair of teeth 4, 5 and/or splines will go along the arc of each tooth 4, 5. The point of contact will go from a first position where the tooth 5 of the central part will start to take up load and to a second position where the tooth 5 of the central part will not take up any load. Thus, successive teeth 5 will take up the load during a revolution. The direction of rotation will determine in which direction the point of contact will go in a specific pair of teeth 4, 5. The parts of the face of each tooth 4, 5, which are expected to make contact with a co-operating tooth 4, 5 are referred to as contact parts, as indicated above.

In FIGS. 4a to 4f teeth having different forms are shown. The curved form may be a circle arc or be an arc with a spiral form, thus, having varying radii. The arc may go over the top with the same form or it may be two arcs merging into each other at the top. Thus, in some cases there is one arc form at the left tooth face and another arc form at the right tooth face. The teeth 4, 5 of the disc 2 and central part 3, respectively, may have different combinations of convex and concave forms. The shown teeth forms are only some examples and a person skilled in the art realises that the form may vary in many further ways. In some embodiments parts of the teeth faces are straight, however the clearance must be big enough to avoid contact for the straight parts in a released position for the brake. In a braking position they may make contact. The parts of the teeth placed outside the contact parts in released position may have varying clearance.

If all the conditions for a rattle-free interface in a released position is fulfilled the following applies. The form of the contact parts of the teeth is such that in each point of contact between the teeth 4, 5 of each disc 2 and the central part 3, respectively, the tangents of the arcs of the teeth 4, 5 are virtually horizontal.

The number of teeth 4, 5 and/or splines does also influence the vibration and noise level. An increased number of teeth 4, 5 will give reduced vibrations and noise. Furthermore, the angular length of the contact parts having an arced shape and an almost constant nominal clearance at each tooth 4, 5, is of importance regarding reduction of vibrations and noise.

The number of teeth 4, 5 and the above described angular length of the contact part at each tooth 4, 5 are interrelated regarding vibration and noise level. Thus, if the number of teeth 4, 5 is low the angular length should be relatively large. Whereas if the number of teeth 4, 5 is relatively high the angular lengths could be shorter and still give a reasonable vibration and noise reduction. In order to have a reasonable balance between the number of teeth 4, 5 and the angular lengths, each teeth 4, 5 of the discs 2 and the central part 3, respectively, should have an accumulated angular length of the arced contact parts larger than 360°/Z, preferably larger than 2(360°/Z), where Z is the number of teeth 4, 5. If this angular length is even larger, the number of teeth in simultaneous contact increases. This will reduce the influence from manufacturing imperfections and by that reduce the vibrations and noise even more. The expression "accumulated angular length" as used in this description refers to the angular length of the contact part of one tooth. If the arc has a varying radius said accumulated angular length is composed of several separate angular lengths, in principal one for each radius.

The invention claimed is:

1. A disc brake having a caliper receiving one or more brake pads and encircling one or more brake discs, of which at least one brake disc is received sliding on a central part in the form of a hub or sleeve, which central part is received on a wheel axle, the at least one disc being connected to the central part in a rotationally interlocked but axially sliding way by means of teeth or splines wherein at least contact parts of the teeth or splines of the at least one disc and/or the central part comprise arcs, along the direction of the wheel axis, which contact parts are parts of the teeth faces expected to make contact with each other at rotation in a released position of the brake, wherein the contact parts on each tooth and/or spline of each disc and/or the central part have the form of arcs with an accumulated arc length larger than 360°/Z, where Z is the number of teeth of the disc and the central part.

2. The disc brake of claim 1, wherein at least two pairs of teeth and/or splines of each disc and the central part are in contact, on each side of a vertical central line.

3. The disc brake of claim 2, wherein the tangent of each point of contact between the teeth and/or splines of the brake disc(s) and the central part is substantially horizontal to the force of gravity in a released position of the brake.

4. The disc brake of claim 3, wherein the arcs have constant or varying radii.

5. The disc brake of claim 4, wherein the arcs formed on the contact parts on each tooth and/or spline of each disc and/or the central part have an accumulated arc length larger than 2 (360°/Z).

6. The disc brake of claim 5, wherein the contact parts on the teeth of the at least one disc and the central part have the form of arcs with an accumulated arc length exceeding 20°.

7. The disc brake of claim 6, wherein the contact face on each tooth is formed of an arc going from the root on one side of the tooth to the root on the other side of the tooth.

8. The disc brake of claim 1, wherein the contact face on each tooth is formed of two arcs, wherein each arc goes from the respective root on opposite sides of the tooth to the top of the tooth.

9. The disc brake of claim 8, wherein the arc forms of the teeth are identical in the contact parts of each disc and the central part.

10. The disc brake of claim 9, wherein the teeth and/or splines of the disc(s) and/or the central part are helically arranged.

11. The disc brake of claim 10, wherein the teeth and/or splines of the disc(s) and/or the central part have straight contact faces.

12. A disc brake comprising:
- a caliper for receiving at least one brake pad and encircling at least one brake disc;
- said at least one brake disc being received on a central part forming a hub which is received on a wheel axle;
- said at least one disc being coupled to said central part in a rotationally interlocked but axially sliding manner by means of teeth or splines that form contact parts of said at least one disc and said central part;
- said contact parts comprise arcs alone the direction of the wheel axis,
- wherein the tangent of each point of contact between the teeth and/or splines of the brake disc(s) and the central part are substantially parallel to each other in a released position of the brake; and
- wherein the contact parts on each tooth and/or spline of each disc and/or the central part have the form of arcs with an accumulated arc length larger than 360°/Z, where Z is the number of teeth of the disc and the central part.

13. The disc brake of claim 12 wherein the arcs formed on the contact parts on each tooth and/or spline of each disc and/or the central part have an accumulated arc length larger than 2 (360°/Z).

* * * * *